Figure 1:
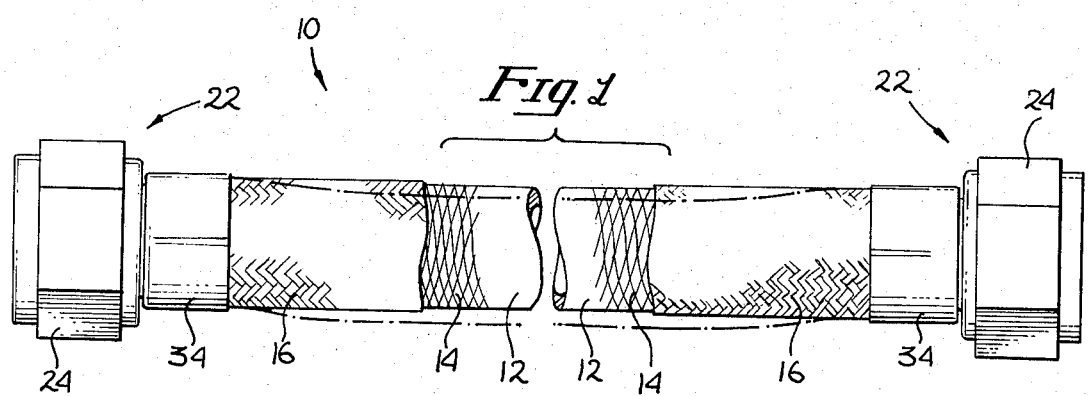

United States Patent [19]
Lawless et al.

[11] 3,791,415
[45] Feb. 12, 1974

[54] RESILIENT FLEXIBLE HOSE

[75] Inventors: Glen D. Lawless, Fountain Valley;
Leonard E. Ullrich, Fullerton, both of Calif.

[73] Assignee: Hydraflow Supply, Inc., Los Angeles, Calif.

[22] Filed: May 15, 1972

[21] Appl. No.: 253,295

[52] U.S. Cl................. 138/127, 138/32, 138/144, 219/301
[51] Int. Cl............................................. F16l 11/00
[58] Field of Search...... 219/301, 522, 547; 174/47, 174/70 R; 138/33, 127, 123, 124, 125, 126, 130, 138, 129, 144, 32

[56] References Cited
UNITED STATES PATENTS

| | | | |
|---|---|---|---|
| 3,460,578 | 8/1969 | Schmid | 138/125 |
| 2,277,177 | 3/1942 | Wermine | 138/125 X |
| 3,522,413 | 8/1970 | Chrow | 138/33 X |
| 3,230,979 | 1/1966 | Tenreiro | 138/130 |
| 2,977,839 | 4/1961 | Koch | 138/123 X |
| 2,730,133 | 1/1956 | Holland-Bowyer et al. | 138/127 |

OTHER PUBLICATIONS

Whittington's Dictionary of Plastics, Lloyd Whittington, Technomic Publishing Co., 1968, pg. 219.

Primary Examiner—William T. Dixson, Jr.
Assistant Examiner—Steven M. Pollard

[57] ABSTRACT

A longitudinally resilient flexible hose having an inner elastomeric tube wrapped on its exterior with an open wire braid at a pitch of approximately 70°, which wire braid is in turn sheathed with a sheath of fiber yarn braided at a pitch of approximately 55°.

7 Claims, 4 Drawing Figures

PATENTED FEB 12 1974 3,791,415

RESILIENT FLEXIBLE HOSE

Previously, flexible hoses have generally been designed and constructed so as to retain and resist internal pressure. Indeed, in hydraulic hoses it is essential that the longitudinal and circumferential internal dimensions of the hose remain substantially unchanged upon the application of pressures of hundreds or even thousands of pounds per square inch. When such a dimensionally stable hose is subjected to having water frozen within it, it either bursts immediately or yields inelastically. In general, the internal diameter of the dimensionally stable hose increases each time that water is frozen within it until within a very few cycles of thawing and freezing, the hose bursts. Also, once having been subjected to having water frozen within it, the hose is generally unsafe for its intended purpose of containing pressure. The respective ends of flexible hoses are generally attached to rigidly mounted fittings so that contraction longitudinally of the hose tends to tear the hose away from its fittings. The freezing and thawing of water in hoses that are designed and intended to be dimensionally stable often result in this undesirable phenomenon.

In certain applications flexible hoses must of necessity withstand repeated cycles of freezing and thawing of water internally of the hoses. For example, water systems aboard vehicles; such as, airplanes, boats, house trailers, campers, motor homes, and the like, will often be subjected to climates where freezing and thawing occur repeatedly.

According to the present invention, these and other difficulties of the prior art have been overcome, and a longitudinally resilient flexible hose is provided. The longitudinally resilient flexible hose of this invention is capable of being subjected to repeated cycles of internally frozen and thawed water without bursting or pulling away from its fittings. The longitudinally resilient flexible hose of this invention has substantially stable dimensions along its radial circumference. Substantially all of the expansion and contraction required to accommodate the internal freezing and thawing of the water takes place in the longitudinal direction. The longitudinal expansion and contraction is sufficient to accommodate the approximately 11 percent change in volume that water undergoes in a change of phase between the liquid and solid phases.

The problem of providing hoses for potable water systems aboard aircraft is particularly acute. For aircraft purposes it is necessary that the hose, in addition to withstanding repeated freezing and thawing cycling, must be noncombustible, lightweight, noncontaminating, capable of withstanding an internal vacuum for purging purposes, capable of being bent around a small radius for mounting purposes and have a relatively long shelf life. The longitudinally resilient flexible hose of this invention satisfies all of these requirements very well.

Figure 2:
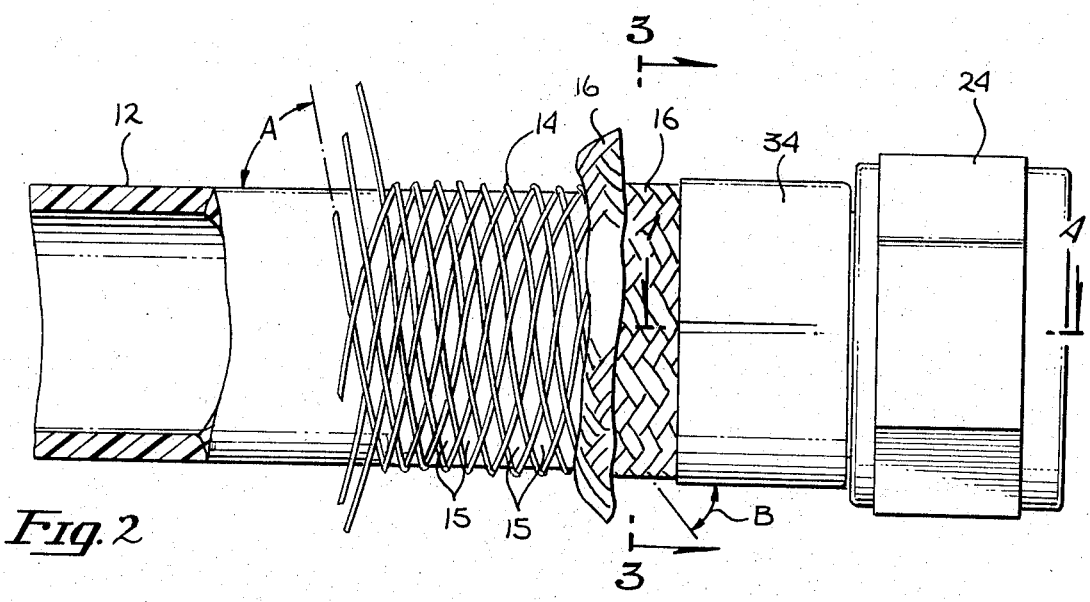
Figure 3:
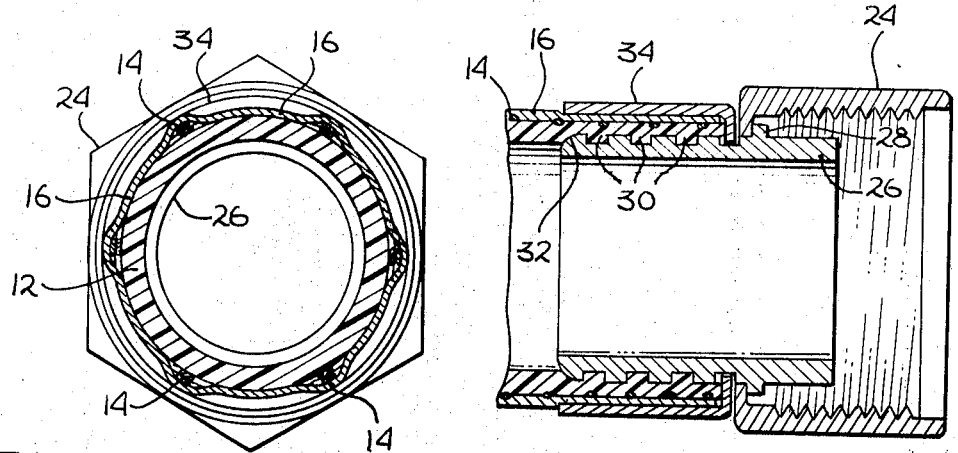

In the drawing there is illustrated:

FIG. 1, a diagrammatic side elevation of the novel hose with certain parts broken away to show the construction of the hose wall;

FIG. 2, a fragmentary diagrammatic side elevation of a piece of the novel hose with certain parts broken away to show the construction of the hose wall;

FIG. 3, a transverse section on line 3—3 in FIG. 2; and

Figure 4:
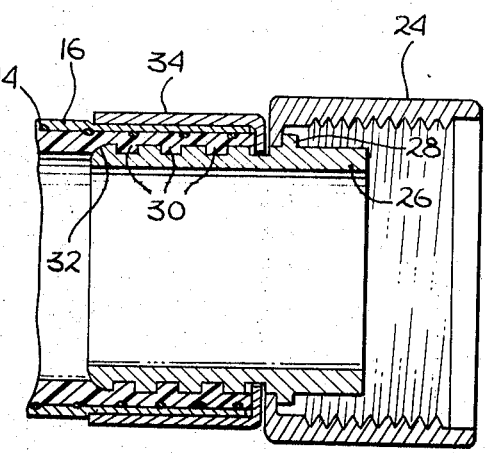

FIG. 4, a longitudinal section on line 4—4 in FIG. 2.

Referring particularly to the drawing, there is illustrated a longitudinally resilient flexible hose indicated generally at 10. Hose 10 includes a seamless elastomeric fluid-conducting tube 12, the inside diameter of which is a large multiple of its wall thickness; for example, a diameter to wall thickness ratio of about seven to one has been found to be satisfactory. There is an open mesh steel wire braid 14 applied to the exterior periphery of tube 12. There is a full braided sheath 16 applied over wire braid 14. Braided sheath 16 is composed of fiber yarns which are braided so that pitch angle B has a value of approximately 55°. Wire braid 14 is applied so that pitch angle A has an angle of approximately 75°. Braided sheath 16 is bonded through the openings 15 in wire braid 14 to the exterior periphery of tube 12.

The respective ends of hose 10 are provided with hose fittings 22. Hose fittings 22 include a female coupling element 24 that is mounted to and retained in position on coupling sleeve 26 by means of integral retainer ring 28. The exterior cylindrical periphery of coupling sleeve 26 is provided with annular grooves 30. Annular grooves 30 act so as to define O-rings with the material on the inner periphery of elastomeric tube 12. The elastomeric material of which tube 12 is composed flows into annular grooves 30 so as to prevent coupling sleeve 26 from being moved axially relative to tube 12. The radiused end 32 of coupling sleeve 26 prevents the tube 12 from being severed where it contacts the innermost end of coupling sleeve 26. The elastomeric material of which tube 12 is composed is forced into annular grooves 30 by crimped sleeve 34.

The action of hose 10 under the force of freezing and thawing water is illustrated in FIG. 1. In FIG. 1 the hose 10 is shown in the contracted position that it assumes when water contained therein is entirely in the liquid phase. The phantom lines illustrate the longitudinally expanded configuration that the hose 10 assumes when the water contained therein is entirely frozen and the ends of the hose are fixed. When the water freezes, the hose lengthens and the increased length is accommodated by the bending of the hose 10, as shown in the phantom lines in FIG. 1.

The open wire braid and the braided sheath are applied over tube 12 generally through the use of conventional braiding machines. During the braiding operations, the elastomeric tube 12 is supported by an internal mandrel. The braiding of the sheath 16 is immediately preceded by the application of a bonding agent, which upon curing will bond the braided sheath to the exterior of tube 12.

The seamless elastomeric tube 12 is composed of a material that is sufficiently resilient to accommodate repeated expansion and contraction without losing any of its desirable properties. For applications in electronic cooling systems, the elastomer of which tube 12 is composed may be a synthetic organic elastomeric polymer. For use in potable water systems it is generally preferred to use a silicone elastomer. One suitable silicone elastomer is that sold by General Electric as "GE Silicone SE 88."

The wire braid 14 is preferably a stainless steel wire, and the braid is a one-tenth rather than a full braid. This provides openings 15 through which the braided sheath 16 is bonded to the exterior of tube 12. Satisfactory results are obtained using a single stainless steel wire wrapped at a pitch angle A of from about 82° to 97° and preferably approximately 85°. Such a single helical coil of wire on the exterior cylindrical surface of tube 12 tends to become displaced during handling and application of the bonding agent and the braiding of the sheath. This produces unsatisfactory results because the properties of the hose are then not uniform from one end to the other. It is generally necessary to use a braid because the braid will remain in the same position with respect to tube 12 during the completion of the manufacturing process and in use. The wire braid should be braided at a pitch angle A of at least about 70° and preferably approximately 75°. Braiding the wire at pitch angles of greater than approximately 75° is very difficult to accomplish using conventional braiding equipment and would not leave sufficient space between the wires to allow a proper bonding of the inner tube to the outer braid.

The full braided sheath 16 is braided from a yarn. The yarn may be composed of refractory inorganic fibers, such as glass, or may be composed of organic fibers, such as polyester or nylon, or it may be composed of an admixture of organic and inorganic fibers. Where the hose 10 is intended for aircraft use, it is essential that braided sheath 16 be noncombustible. A particularly suitable material for aircraft application is a high temperature nylon material identified by the trademark "NOMEX." This material is sold by DuPont and will char at elevated temperatures but will not burn. The fully braided sheath 16 is braided at a pitch angle B of from about 52° to 57° and preferably approximately 55 degrees.

The braided sheath 16 is bonded to the exterior of tube 12 through openings 15 by means of a suitable bonding agent. The particular bonding agent is chosen so that it is compatible with both tube 12 and sheath 16 and will provide a consistently strong bond between these two in each of openings 15. If desired, a bonding agent may be chosen so that curing takes place under conditions of elevated temperature. When elevated temperatures are required to cure the bonding agent, it is often desirable to select the elastomer of which tube 12 is composed so that it is only semicured when hose 10 is constructed, and fittings 22 are applied. The final curing of the elastomeric material in tube 12 is accomplished concurrently with the curing of the bonding agent. Where the tube 12 is composed of a silicone elastomer and braided sheath 16 is composed of an organic fiber yarn, one suitable bonding agent is that sold by General Electric under the designation "RTV 118."

The application of hose fittings 22 to the respective ends of hose 10 before the elastomer in tube 12 is completely cured facilitates the extrusion of the material of tube 12 into annular grooves 30. This promotes the formation of a strong union between fitting 22 and tube 12. In potable water systems it is generally preferable to construct coupling sleeve 26 from stainless steel so as to avoid contaminating the water within the system. Since the flexible hose 10 is designed to yield longitudinally to the application of internal pressure rather than to contain that pressure without change in dimension, it is unnecessary to construct fittings 22 from high strength materials. In general, female coupling element 24 and coupling sleeve 26 may be constructed of aluminum where there is no problem of contaminating a potable water system. Even in potable water systems, female coupling element 24 and crimp sleeve 34 may be constructed of aluminum if desired. The use of aluminum decreases the weight of the hose assembly.

In certain applications it is desirable to maintain a constant operating temperature when the system is in operation, and for this reason a heating element may be included in either the wire braid 14 or the braided sheath 16. In general, heating elements comprise either electrically resistant elements to which a current is applied, or hollow elements through which a heated fluid medium is passed. Because of the difficulty of working with small diameter, hollow conduits, it is preferable to use electrically actuated heating elements and to incorporate them into the covering of tube 12 either in the wire braid 14 or the braided sheath 16. If desired, heating elements may be applied over the exterior periphery of braided sheath 16 so long as the temperatures achieved by the heating element are not sufficiently high to damage braided sheath 16 structurally.

What is claimed is:

1. A longitudinally resilient flexible hose comprising:

a fluid conducting tubular member;
a covering around the exterior periphery of said tubular member including;
a metallic wire element extending in spaced helical convolutions around the outer periphery of said tubular member at a pitch of at least about 70°; and a sheath means of yarns braided at a pitch of from about 52° to 57° over the said convolutions of the metallic wire elements, the inner periphery of said sheath means being bonded to the exterior periphery of said tubular member.

2. A longitudinally resilient flexible hose of claim 1 including a plurality of metallic wires braided in an open braid around the outer periphery of the tubular member.

3. A longitudinally resilient flexible hose of claim 1 wherein the covering includes a heating element.

4. A longitudinally resilient flexible hose of claim 1 wherein the tubular member is a seamless silicone elastomer tube.

5. A longitudinally resilient flexible hose of claim 1 wherein the convolutions of the metallic wire element extend at a pitch of approximately 75°.

6. A longitudinally resilient flexible hose of claim 1 wherein the sheath means is composed of organic fiber yarns and is braided at a pitch of approximately 55°.

7. A longitudinally resilient flexible hose comprising:

a seamless silicone elastomer tube;
an open metallic wire braid around the outer periphery of said tube, said braid being braided at a pitch of approximately 75°; and
a sheath of fire resistant synthetic polymeric fiber yarns braided at a pitch of approximately 55°, the inner periphery of said sheath being bonded to the exterior periphery of said tube through the openings in said braid.

* * * * *